Jan. 31, 1967   R. D. WILLIAMS ETAL   3,301,086
TRANSMISSION CONTROL
Filed Sept. 12, 1963   3 Sheets-Sheet 1

INVENTORS
Richard D. Williams,
BY Nicholas J. Plumeri, &
Homer V. Krautwurst

ATTORNEY

INVENTORS
Richard D. Williams,
Nicholas J. Plumeri, &
Homer V. Krautwurst
ATTORNEY Jan. 31, 1967  R. D. WILLIAMS ETAL  3,301,086
TRANSMISSION CONTROL
Filed Sept. 12, 1963  3 Sheets-Sheet 3
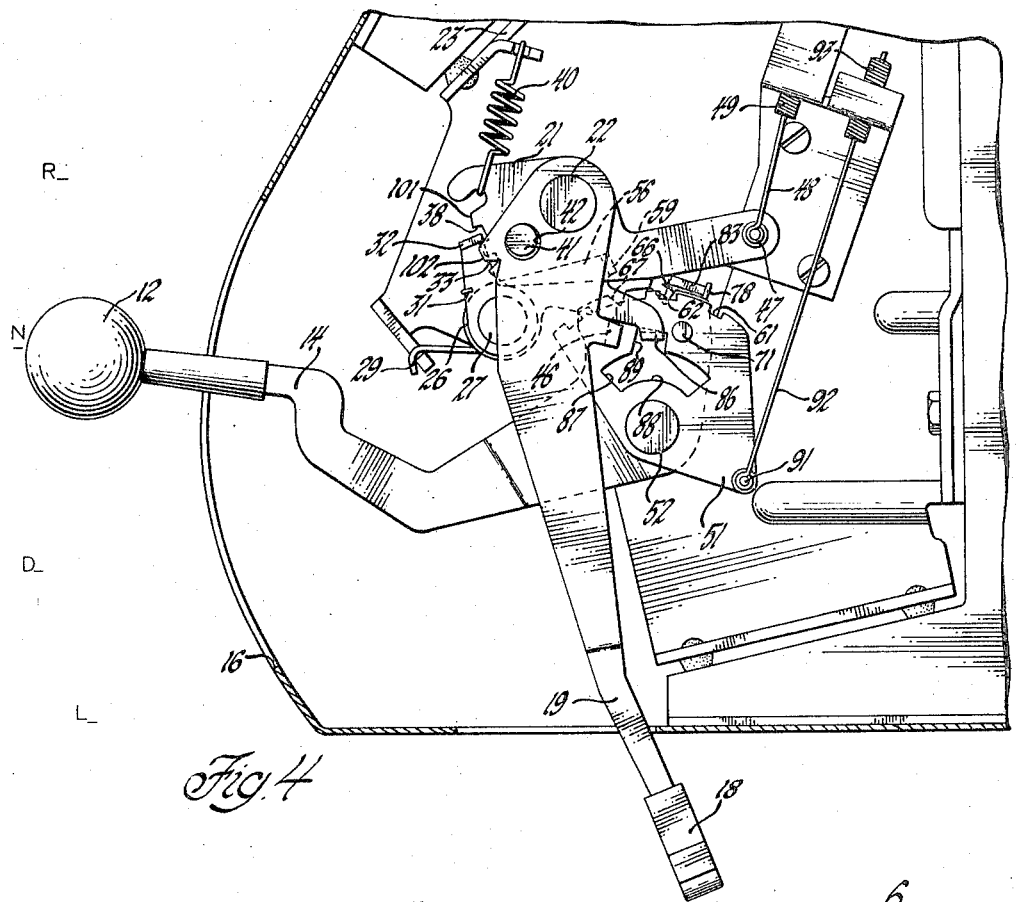
Fig. 4
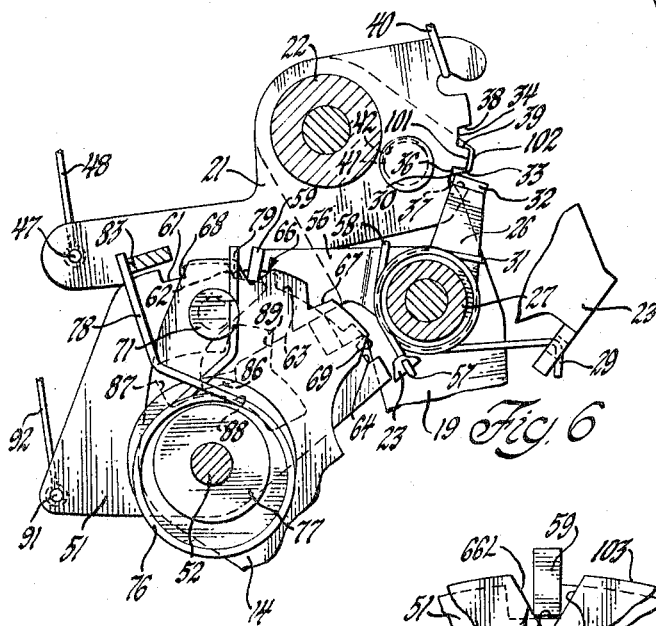
Fig. 6
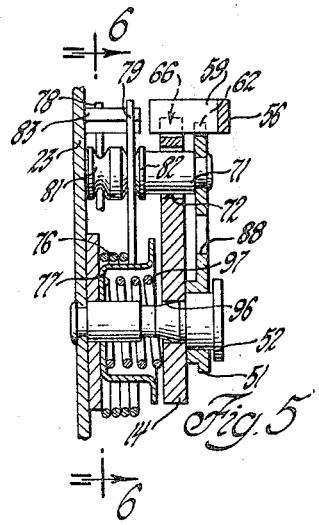
Fig. 5
Fig. 7
INVENTORS
Richard D. Williams,
Nicholas J. Plumeri, &
Homer V. Krautwurst
BY a. M. Leiter
ATTORNEY

United States Patent Office 3,301,086
Patented Jan. 31, 1967

3,301,086
TRANSMISSION CONTROL
Richard D. Williams, Fairport, and Nicholas Joseph Plumeri and Homer V. Krautwurst, Rochester, N.Y., assignors to General Motors Corporation, Detroit, Mich., a corporation of Delaware
Filed Sept. 12, 1963, Ser. No. 308,491
17 Claims. (Cl. 74—475)

This invention relates to a control linkage and more particularly to a transmission control linkage.

The transmission control linkage employs an operator actuated shift control lever to selectively move the shift control member or valve to a plurality of shift control positions. There is also an operator controlled park lever which, when it is moved from the drive position to the park position, actuates a transmission parking lock mechanism to engage or permit engagement of the parking lock. The shift control lever and the park lever are automatically interconnected by the linkage mechanism so that on initiation of movement of the park lever from the drive position, the mechanism first releases the shift lever from any shift position and returns it to the neutral position and then permits continued movement of the park lever to the park position.

Both the shift lever and the park lever have a releasable detent mechanism to accurately locate these levers in each of their positions. These detent mechanisms employ a detent sector having a radial face which engages a radial face on a pawl. These faces of these members are resiliently held in engagement by a spring. Each operating lever is connected to a sector lever by a lost motion connection and has a cam portion which lifts the pawl out of engagement with the sector lever as the operating lever is moved through the lost motion movement. Then a cam surface on the operating lever holds the pawl disengaged until the operating lever is moved to another position where the cam surface permits engagement of the pawl with a notch in the sector lever.

An object of the invention is to provide in a transmission control linkage, a shift control lever suitably connected to a transmission shifting member and a park lever suitably connected to a transmission parking lock member and interconnecting devices operative during movement of the park lever from the drive position to the park position to automatically return the shift lever to neutral position.

Another object of the invention is to provide in a transmission shift control linkage having a shift control lever movable from neutral to a plurality of drive positions to operatively control a transmission shift member, a park lever movable between a drive position and a parking position in which it is operative to engage a transmission parking lock mechanism and automatic interconnecting means operative on initiation of movement of the parking lever to return the shift control lever from any shift position to the neutral position and to inhibit movement of the park lever from the drive position to the park position until the shift lever has returned to the neutral position.

Another object of the invention is to provide in a control linkage, a primary lever movable between a plurality of positions to control one device, a secondary lever movable between a plurality of positions to control a second device operatively connected to said primary lever to return said primary lever to one position during movement of said secondary lever from one to another position.

Another object of the invention is to provide in a control linkage an operating lever movable to a plurality of positions and retained in each position by a sector associated with the operating lever having a radial surface portion cooperating with the radial surface portion of a pawl for accurately locating the operating lever in each of said positions, and the operating lever and the sector being interconnected to release the pawl on the initiation of movement and to engage the pawl on the completion of movement.

These and other objects of the invention will be more apparent from the following description and drawings of a preferred embodiment of the invention.

FIGURE 4 is a similar sectional view with the shift lever in neutral;

FIGURE 5 is a sectional view of FIGURE 3 on the line 5—5;

FIGURE 6 is a sectional view of FIGURE 5 on the line 6—6; and

FIGURE 7 is an enlarged partial view of notch 62 of FIGURE 3.

Figure 1:
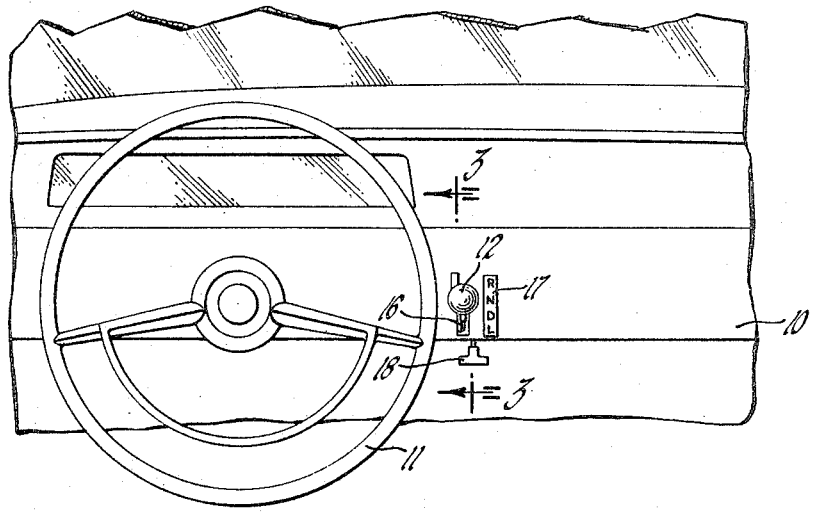
FIGURE 1 shows the transmission control linkage mounted on a vehicle dash panel.

The applicants' invention in a control linkage is illustrated in the preferred embodiment of a transmission control mechanism mounted on the dash panel 10 of an automotive vehicle adjacent the steering wheel 11 and provides a handle 12 for operating the shift control or primary operating lever 14 which projects through a slot 16 in the dish adjacent the label 17 indicating the shift positions: Reverse "R," Neutral "N," Drive "D" and Low "L." The reverse portion of the slot may be offset to provide a gated slot. The handle 18 projecting below the dash panel 10 is connected to actuate the parking lever or secondary operating lever 19.

The parking lever 19 and the parking sector lever 21 are coaxially pivoted to the pivot shaft 22 which is fixed to the support plate 23. The parking pawl 26 is pivotally mounted on a pawl pivot member 27 fixed to the support 23 and resiliently biased by a coil spring 28 having one end 29 anchored to the support and the other end 31 engaging the pawl 26 to rotate the pawl in a clockwise direction, as viewed in FIGURES 2–4, so the tang 32 engages the parking lever 19 and parking sector lever 21. The parking lever has a V-shaped notch 30 to provide a sloped camming surface 33 to release the pawl from the drive position and a sloped camming surface 34 to release the pawl from the park position. The sector lever 21 has a drive position recess 36 having a stop face 37 and a parking position recess 38 having a stop face 39. The coil spring 40 suitably connected to the parking sector lever 21 and the support 23 resiliently biases the parking sector lever in a clockwise direction so that only the stop surfaces 37 and 39 engage the flat face of tang 32 on pawl 26. It should be noted that these flat stop surfaces are radial and that they engage a flat radial surface on the tang 32 to provide surface contact as distinguished from a point contact detent mechanism.

The parking lever 19 is connected to the parking sector lever 21 by a lost motion connection consisting of a pin 41 fixed to the sector lever 21 and projecting through an aperture 42 of slightly larger diameter than the pin in the parking lever 19. The parking lever has an interlock tang 46 which, as explained below, cooperates with the shift pawl to actuate the interlock and return mechanism. The parking sector lever 21 has at the other end an anchor pin 47 to which the cable 48 of the sheathed cable structure 49 is connected to actuate a parking interlock member, not shown, in a transmission.

The shift operating lever 14 and the shift sector lever 51 are both pivotally mounted on the pivot pin 52 which is secured to the support 23. The shift pawl 56 is pivotally mounted on the pawl pivot 27 and has a coil spring wrapped around the pivot with one end 57 engaging the support and the other end 58 engaging the pawl 56 to urge the pawl clockwise, as viewed in FIGURES 2, 3 and 4 and counterclockwise as shown in FIGURE 6, so that the tang 59 engages the shift operating lever 14 and the shift sector lever 51.

As viewed in FIGURE 6, the shift sector lever 51 has at its periphery a square notch 61 for low position and a square recess 62 for drive position, an elongated clearance recess 63 for neutral position which, as will be explained below, does not position the shift sector in neutral position, and a square recess 64 for reverse position. The shift lever 14 has a V-notch 66 cooperating with the pawl tang 59 in the drive position and a V-notch 67 cooperating with the pawl tang in the neutral position, both of which are operative when the shift lever is moved in either direction from either of these positions to lift the pawl tang out of engagement with the recesses in the sector lever. There is also a cam surface 68 at the low position and a cam surface 69 at the reverse position, the single surface being sufficient to lift the tang 59 as the shift lever is only moved away from these end positions toward a central position.

A lost motion connection is provided between the shift lever 14 and the shift sector lever 51 by the pin 71 which is secured to the sector lever 51 and passes through an aperture 72 of a larger diameter than the pin 71 to permit lost motion. A coil spring 76 is wrapped around a cup-shaped member 77 which is positioned by the pivot pin 52 which has a pair of crossed ends 78 and 79 which are biased to move toward each other and which engage recessed portions 81 and 82 respectively on the lost motion pin 71 fixed on shift sector 51 and a stop 83 of the same width fixed to the support 23. The shift pawl 56 also has an interlock tang 86 projecting into an interlock slot 87 in the shift sector lever 51. The interlock slot 87 has a circular portion 88 which permits free movement of the shift sector 51 to all shift positions when the pawl 56 is in the detent operating positions with the tang 59 engaging either the lever 14 or the shift sector lever 51. When the interlock tang 46 on the parking lever 19 engages the shift pawl 56 to lift it out of detent position, the interlock tang 86 will, if the shift lever 14 is in neutral position, enter the neutral lock portion 89 of the slot 87 to lock the shift lever in neutral position.

The shift sector lever 51 has an anchor pin 91 to which the cable 92 of the shift cable assembly 93 is secured. The shift cable assembly 93 is suitably connected to the transmission so that the cable 92 operates a shift member.

FIGURE 6 is an enlargement showing the parking lever detent mechanism. The V-groove 30 in parking lever 19 and the rectangular recess 36 in parking sector lever 21 cooperate with the parking pawl tang 32 in the detent position. In the drive position shown, the spring 40 resiliently biases the parking sector lever 21 so that the surface 37 of rectangular recess 36 engages the side face of the tang 32 so that the detent mechanism, by face-to-face contact of flat surfaces, positively positions the sector lever 21 and the parking control mechanism in the transmission. The pawl tang 32 engages cam 33 to hold lever 19 at the clockwise (FIG. 3) end of the lost motion movement to position parking lever 19. It should be noted that in the detent mechanism region the outer perimeter 101 of the sector lever 21 and the outer perimeter 102 of the operating lever 19 are circular about the pivot center and that the radius of the surface 102 of the operating lever is slightly larger than the radius of the sector lever. On movement of the parking lever from the drive position, FIG. 3, toward the park position, FIG. 4, the lost motion connection provided by the pin 41 and aperture 42 permits a small initial free movement of the parking lever 19 relative to the sector 21 sufficient to cause cam surface 33 to lift the tang 32 and its parking pawl 31 out of the recess 36 and up on to the circular surface 102 to disengage the tang 32 from the recess 36 to permit continued movement of the parking lever 19 to the park position.

The parking lever detent mechanism in the park position, FIG. 4, functions in the same manner. The same flat side of tang 32 engages radial side 39 of recess 38 in sector lever 21 to hold it in park position. The pawl tang 32 engages cam 34 to hold lever 19 at the counter clockwise end of lost motion movement to position lever 19. On return movement of park lever 19 from the park position, FIGURE 4, the cam surface 34 on lever 19 lifts pawl tang 32 out of recess 38 over surface 92 to place it in V-notch 30 and recess 36.

In the shift mechanism, the detent arrangement functions in substantially the same manner. The tang 59 of pawl 56 is biased to engage the notches in shift sector lever 51 and the cam surfaces of shift lever 14. Since the shift sector lever 51 is biased by the spring 76 from each driving position toward the neutral position, the radial surface of the tang 59 is engaged by the side of the notches 61, 62 and 64 adjacent the neutral position. On movement from neutral in either direction, the lost motion device being centered is not effective and V-notch 67 cams the tang 59 upon the circular perimeter surface 103 clearing circular surface 104. Since the neutral notch 63 in sector lever 51 is long, the tang does not engage the end of this notch. On initial movement of shift lever 14 from the drive position toward the neutral position, the lost motion device permits free movement of the shift lever so cam surface nearer neutral 66N (FIG. 7) lifts tang 59 over surface 104 to surface 103 disengaging the detent. On movement from drive to low, the lost motion device is ineffective and cam surface 66L lifts the tang before it can engage the end of recess 62 over surface 104 onto surface 103 for movement to low. On movement from low the lost motion device permits initial free movement of shift lever 14 and cam surface 68 to lift tang 59 out of Low recess 61. On movement from Reverse, there is lost motion movement of the shift lever so cam 69 first lifts tang 59 out of recess 64 onto surface 93 before there is movement of both the shift lever and shift sector lever toward neutral.

The shift lever 14 has a cylindrical bearing mounted on a conical or spherical bearing 96 on the support pin 52 and is retained in position by a spring 97 to provide a universal pivot to permit lateral movement of the shift lever 14 for movement through a conventional gate having an offset portion. The lower end of shift lever 14 has a transversely extending straight edge 98 or two transversely spaced tabs to provide a stop between the end of lever 14 and the shift sector 51 to limit rotation about its longitudinal axis.

*Operation*

Figure 2:
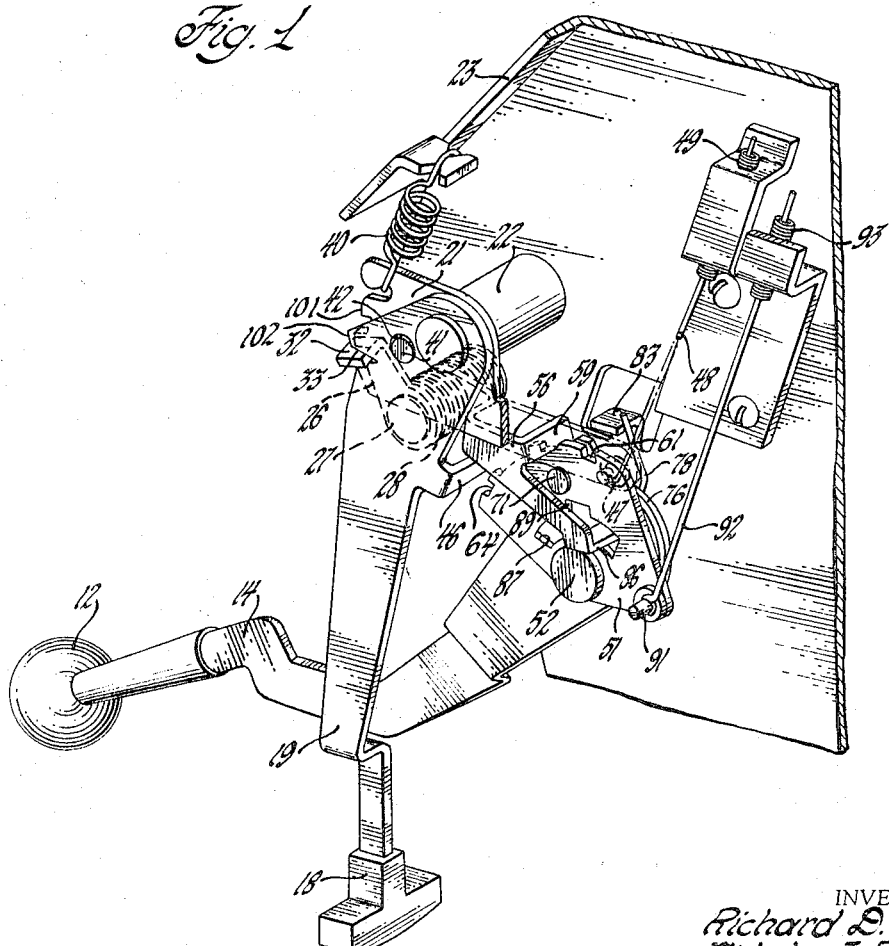
FIGURE 2 is a perspective of the transmission control linkage.
Figure 3:
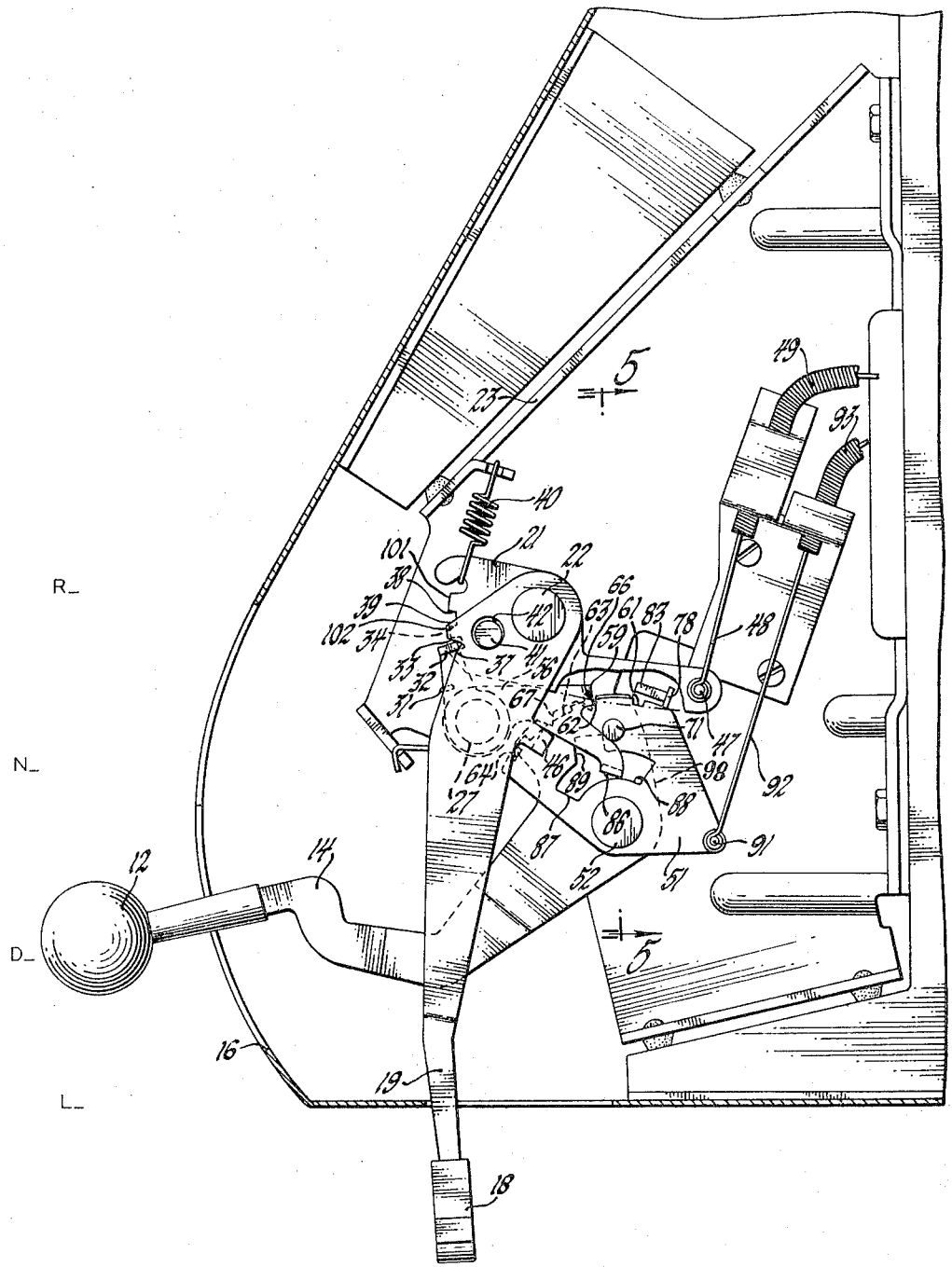
FIGURE 3 is a sectional view of the transmission control linkage on the line 3—3 of FIGURE 1.

With the parking lever 19 in the drive position as shown in FIGURES 2 and 3, the shift lever 14 is free to move from neutral to each of the drive positions, Drive D, Low L and Reverse R, since the interlock tang 86 of the shift lever pawl 56 is in circular recess portion 88. The detent pawl 59 engages the detent mechanism on the shift lever 14 and sector lever 51. In neutral, the shift pawl tang 59 engages the V-notch 67 in the shift lever 14 to position the shift lever in neutral and does not engage the recess 63 in the shift sector lever 51. The recess 63 is sufficiently long so that, at least to the degree of movement permitted by the lost motion connection 71, 72 between these levers and during movement required to lift the tang, the tang cannot engage the shift sector lever 51. Manual movement of the shift lever 14 from the neutral to the drive position causes one side of the notch 67 to cam the tang 59 up on the circular surface 103 between the notches to lift the tang 59 over the ends of notch and the circular surface 104 on the shift sector lever 51 between the neutral notch 63 and the drive notch 62. The shift lever 14 during this movement acts through the lost motion device 71 and 72 to move the shift sector lever 51 with it. When these levers reach the drive position, the tang 59 drops into the drive V-notch 66 in the shift lever 14 and the recess 62 in the shift sector lever 51 (FIG. 7). This clockwise movement, as viewed in FIGURE 6, has moved the leg 79 of spring 76 from the neutral position and thus biases the shift selector lever 51 in a counterclockwise direction (FIG. 6) to hold the tang 59 against the side wall of recess 62 adjacent the neutral recess 63 to positively locate the shift lever 51, the sheathed cable assembly 93 and transmission shift member in Drive position. The pawl tang 59 also is resiliently biased into the V-groove 66 to resiliently hold the shift lever 14 in the Drive position. The shift pawl tang 59 holds the shift lever and shift sector lever in relative position to each other so that the lost motion connection 71, 72 has clearance on the side so that on movement of the shift lever 14 toward neutral the notch 66 will function to cam the tang 59 out of the drive notch 62 in the shift selector lever up on surface 103 to clear surface 104 before the sector lever 51 is moved.

On movement of the shift lever 14 from the drive position toward the low position, there is no lost motion and both the shift lever 14 and the sector lever 51 move together. The V-notch 66 lifts the pawl 59, before reaching the end of recess 62, to surface 103 of shift lever 14 over the circular surface 104 to the end cam surface 68 which permits it to drop into the low recess 61 in the shift sector lever 51. The spring 76 biases the shift sector lever 51 so that the side wall of the notch nearest the neutral notch 63 engages the tang 59. The cam surface 68 and recess 61 position the two levers relative to each other so that there is lost motion permitting initial free movement of the shift lever 14 toward the drive position so that the cam surface 68 functions to lift the pawl tang 59 out of the recess 61 and up on to the circular surface 103 of lever 14 between cam surface 68 and V-notch 66 to permit free movement toward the other drive positions.

In moving from the low position the shift lever 14 may be stopped as the detent passes the Drive or the Neutral positions, or the movement may be continued past these positions since the pawl tang 59 will merely drop in to the V-notches 66 and 67 and be cammed out again.

At the reverse position the cam surface 69 permits the tank 59 to drop into the reverse recess 64 of the sector lever 51 and the pin 71, now engaging the leg 78 of spring 76, biases the shift sector lever 51 so that the tang 59 engages the side wall of recess 64 adjacent the neutral recess 63 to provide a definitely located reverse position. The levers 14 and 51 are positioned so that the lost motion device, on movement of the reverse position toward the neutral position, permits initial movement of the shift lever 14 so that the cam surface 69 lifts the tank 59 out of the recess 64 up on to the circular surface 103 for the normal movement toward the neutral position and other positions beyond this.

When the shift lever 14 and its associated sector lever 51 are in any drive position, movement of the parking lever 19 from the drive position shown in FIGURES 2 and 3 to the park position shown in FIGURE 4, functions to actuate the detent mechanism for the parking lever and to return the shift lever to the neutral position. In the park position (FIG. 3) the parking sector lever 21 is biased by spring 40 so that the surface 37 of notch 36 engages tank 32. On the initial movement of the parking lever 19, the lost motion device 41, 42 permits an initial free lost motion movement of the lever 19 relative to the sector 21 so that the cam surface 33 on the shift lever 19 cams the tang 32 and pawl 26 out of the notch up on to the circular surface 102 between cams 33 and 34. There is just sufficient lost motion movement to accomplish this and then the aperture 42 engages the pin 41 to move both levers together until the tang 32 on the pawl drops over the cam surface 34 and into the recess 38 where the spring 40 holds it against the surface 39. The cam surface 34 and recess 38 are located to position the park lever 19 and park sector lever 21 so the lost motion clearance is oppositely disposed as shown in FIGURE 4 to place the mechanism in position for initial lost motion movement of the park lever on movement from the parking position back to the drive position.

As soon as the parking lever 19, on movement from drive to park position, begins its lost motion movement to disengage the detent pawl 31, the interlock tang 46 also engages the shift lever pawl 56 and lifts the tang 59 out of the notch and recess for any drive position permitting the spring 76 acting through either leg 78 or 79, which engage the lost motion pin 71 fixed to the sector lever 51, to return the sector lever to the neutral position. While the shift lever is in any drive position or any position other than neutral, movement of the parking lever 19 is inhibited at about the half-way point or any suitable mid-point, since the interlock tang 86 on the shift pawl 56 engages the radially outer surface of the circular recess 88 in the shift sector lever 51. However, the spring 76 quickly returns the shift lever 14 to the neutral position so that this inhibiting action is not normally noticed unless there is a malfunction in the device or an excessively fast movement of lever 19 is made. With the shift lever 14 in the neutral position, the shift pawl 56 may move further since its tang 86 can move into recess 89. This permits continued movement of the parking lever 19 toward the park position and the interlock tang 46 continues to move the shift pawl 56 counterclockwise to the park position, as shown in FIGURE 4, so tang 86 enters recess 89 locking the shift lever in neutral.

On movement of the parking lever 19 from the park position to the drive position, the initial lost motion movement of the parking lever 19 relative to the parking selector lever 21, as best shown in FIGURE 4, causes the cam surface 34 to lift the tang 32 of the parking pawl out of the recess 38 and also withdraws the interlock tang 46 from engagement with the shift pawl 56 so that the tang 86 moves out of the neutral interlock recess 89 into the recess 87 permitting free movement of the shift lever and the locking movement of pawl 59. Then the shift lever 14 and its associated detent mechanism may be operated to actuate the transmission shift mechanism, as explained above.

It will be appreciated that the invention may be modified within the scope of the appended claims.

We claim:

1. In a control linkage;
   (a) an operating and an operated lever coaxially pivoted to a support;
   (b) lost motion means operatively connected between said levers permitting free limited movement of said operating lever relative to said operated lever from one to another relative movement limiting position and thereafter moving said levers in unison;
   (c) detent means operatively connected between said support and both of said levers to maintain said levers respectively in said one and another relative positions in one and another detent positions and operative on movement of said operating lever from either position to permit lost motion movement to release said levers and engage both levers at the other position.

2. The invention defined in claim 1 and said detent means being operative in response to movement in a direction beyond one of said detent positions without lost motion to release said levers.

3. The invention defined in claim 1 and said operating lever being mounted for rotary and lateral movement, said operated lever being mounted for only rotary movement and limit pivot means on said operating lever contacting said operated lever to provide a pivot stop transverse to the longitudinal axis of said operating lever to limit rotary movement of said operating lever about its longitudinal axis.

4. The invention defined in claim 1 and said detent means having positive stops to limit movement by the operated lever in either direction and being operative in response to movement of the operating lever in both directions from one detent position to release the detent and permit movement of both levers.

5. The invention defined in claim 1 and return biasing means operative on release of said detent means to return said levers to a central position between said one and another position.

6. The invention defined in claim 1 and said detent means positively blocking movement of said operated lever in one direction at said one position and positively blocking movement of said operated lever in one direction at said other position.

7. In a control linkage;
 (a) an operating lever and an operated lever mounted for rotation coaxially;
 (b) lost motion connected between said levers permitting limited relative movement between one and another relative positions and thereafter connecting said levers for common movement;
 (c) first detent means on said operating lever including a peripheral circular surface portion of large radius and a plurality of non-radial cam surfaces adjacent said peripheral surface;
 (d) second detent means on said operated lever including an outer peripheral surface having a smaller radius at all points than said peripheral surface of said operating lever and having a plurality of recesses each having at least one radial surface;
 (e) biasing means biasing said operated lever in the direction which said radial surfaces face;
 (f) a pawl having a tang biased to engage said detent means and having at least one radial surface operative to engage the radial surfaces on said operated lever;
 (g) and said first detent means and said pawl being operative to locate said levers in said one position and responsive to movement to said another position of said levers to release said detent means and said pawl contacting said circular surface between positions.

8. In a control linkage;
 (a) a primary control level movable to a plurality of control positions;
 (b) primary detent means operatively connected to said primary lever to retain said primary lever in each of said control positions;
 (c) a secondary control lever pivotally mounted for movement to a plurality of control positions;
 (d) secondary detent means operatively connected to said secondary lever to resiliently maintain said secondary lever in each of said plurality of control positions;
 (e) intercontrol means operatively connected to said secondary lever and said primary detent means operative on movement of said secondary lever from one to another position to release said primary detent means;
 (f) and including means operative on release of said primary detent means to return said primary lever to one position.

9. The invention defined in claim 8 and interlock means preventing movement of said secondary control lever to one position when said primary control lever is in certain control positions and operative on said primary control lever reaching one position to permit continued movement of said secondary control lever to another position.

10. The invention defined in claim 8 and said primary control lever being movable from a centrally located neutral control position in one direction to an operative control position and in the opposite direction to another operative control position, and said means operative on release of said primary detent means being operative to return said primary lever from either operative control position to said centrally located neutral position.

11. In a control linkage;
 (a) a primary control lever movable to a plurality of control positions including a predetermined control position and another control position;
 (b) primary detent means operatively connected to said primary lever to retain said primary lever in each of said control positions;
 (c) a secondary control lever pivotally mounted on said support for movement to a plurality of control positions;
 (d) secondary detent means operatively connected to said secondary lever to resiliently maintain said secondary lever in each of said plurality of control positions;
 (e) intercontrol means operatively connected to said secondary lever and said primary detent means operative on initiation of movement of said secondary lever from one to another position to release said primary detent means and to limit movement of said secondary lever while said primary lever is in said another position;
 (f) and including means operative on release of said primary detent means to return said primary lever to a predetermined position and operative on said primary lever reaching said predetermined position to permit continued movement of said secondary lever to said another position and then to lock said primary lever in said predetermined position.

12. In a control linkage;
 (a) a primary control having a primary operating lever movable from neutral in both directions to a plurality of control positions, a primary controlled lever and lost motion means connecting said primary lever initially permitting relative movement from one to another position and thereafter moving together;
 (b) primary detent means operatively connected to said primary levers to resiliently retain said primary levers in each of said control positions and operative in response to lost motion movement of said primary levers to release said primary detent means;
 (c) a secondary control having a secondary operating lever pivotally mounted for movement to a plurality of control positions, a secondary controlled lever and lost motion means connecting said secondary levers initially permitting relative movement from one to another position and thereafter moving together;
 (d) secondary detent means operatively connected to said secondary levers to resiliently maintain said secondary levers in each of said plurality of control positions and operative in response to lost motion movement of said primary levers to release said primary detent means;

(e) intercontrol means operatively connected to said secondary operating lever and said primary detent means operative on initial movement of said secondary operating lever from one to another position to release said primary detent means and to prevent movement of said secondary operated lever to said another position;

(f) and including means operative on release of said primary detent means to return said primary lever to a predetermined position and operative on said primary lever reaching said predetermined position to permit continued movement of said secondary lever to said another position.

13. In a control linkage;
(a) an operating and an operated lever coaxially pivoted to a support for movement to a plurality of detent positions;
(b) lost motion means operatively connected between said levers permitting free limited movement of said operating lever relative to said operated lever from one to the other relative movement limiting position and thereafter moving said levers in unison;
(c) detent means including a pawl having a single nose, a cam surface on said operating lever for each detent position, a detent surface on said operated lever for each detent position, and means to bias said pawl to an engaged position to engage said pawl nose with said cam and detent surfaces at each detent position when it is selected, said pawl being operative in said engaged position to normally hold said operating and operated levers in a relative position at the selected detent position and said pawl being operative in response to initial movement of said operating lever from the selected detent position during the lost motion movement of said operating lever from one to the other relative position without movement of said operated lever, and said initial movement of said operating lever moving the cam surface on said operating lever at the selected detent position in engagement with said pawl nose to lift said pawl nose from said engaged position to a disengaged position out of engagement with the detent surface at the selected detent position and then during continued movement of said levers in unison to permit movement of said operating and operated lever to another detent position.

14. The invention defined in claim 13 and said operating lever on initial movement in one direction providing said lost motion movement to lift the pawl out of engagement and said cam surfaces being operative on initial movement in the opposite direction camming said pawl away from said detent surface without lost motion movement.

15. In a control linkage;
(a) an operating and an operated lever coaxially pivoted to a support;
(b) lost motion means operatively connected between said levers permitting free limited movement of said operating lever relative to said operated lever from one to another relative movement limiting position and thereafter moving said levers in unison;
(c) lever biasing means to bias said operating lever in one direction;
(d) detent means including a pawl having a radial surface, cam surfaces on said operating lever at each of a plurality of detent positions, radial detent surfaces on said operated lever at each of a plurality of detent positions facing in the direction that said operated lever is biased by said lever biasing means, and means to bias said pawl to an engaged position to engage said cam and detent surfaces at one detent position, said pawl in said engaged position being operative to normally hold said operating and operated levers in said one relative position at one detent position and said pawl being operative in response to initial movement of said operating lever in said one direction from said one detent position during the lost motion movement of said operating lever from said one to another relative position without movement of said operated lever, and said initial movement of said operating lever moving the cam surface on said operating lever at said one detent position in engagement with said pawl to lift said pawl from said engaged position to a disengaged position out of engagement with the radial surface at said detent position and then during continued movement of said levers in unison to permit movement of said operating and operated lever to a second position permitting movement of said pawl so that the radial surface on said pawl and another detent surface on said operated lever engage under the biasing force of said operated lever biasing means to locate said operated lever in a second position, and the pawl engages another cam surface on the operating lever to locate said lost motion means in said another position.

16. In a control linkage;
(a) an operating and an operated lever coaxially pivoted to a support;
(b) lost motion means operatively connected between said levers permitting free limited movement of said operating lever relative to said operated lever from one to another relative movement limiting position and thereafter moving said levers in unison;
(c) means to bias said operating lever in one direction;
(d) detent means including a pawl having one detent surface, cam surfaces on said operating lever at each of a plurality of detent positions, detent surfaces on said operated lever at each of a plurality of detent positions facing in the direction that said operated lever is biased, and means to bias said pawl to an engaged position to engage said cam and detent surfaces selectively at each detent position, said pawl being operative in said engaged position to normally hold said operating and operated levers in a relative position at each detent position, and said pawl being operative in response to initial movement of said operating lever in said one direction from said each selected detent position during the lost motion movement of said operating lever from said one to another relative position without movement of said operated lever, and said initial movement of said operating lever moving the cam surface on said operating lever at said selected detent position in engagement with said pawl to lift said pawl from said engaged position to a disengaged position out of engagement with the detent surface on said operated lever at said selected detent position and then during continued movement of said levers in unison to permit movement of said operating and operated lever to a second position permitting movement of said pawl so that the detent surface on said pawl and another detent surface on said operated lever engage under the biasing force of said operated lever biasing means to locate said operated lever in a second position.

17. In a control linkage;
(a) an operating and an operated lever having peripheral surfaces with the operating lever having a circular peripheral surface having a larger radius at all points than the peripheral surface of the operated lever and both levers coaxially pivoted to a support;
(b) lost motion means operatively connected between said levers permitting free limited movement of said operating lever relative to said operated lever from one to another relative motion limiting position and thereafter moving said levers in unison;
(c) means to bias said operating lever in one direction;
(d) detent means including a pawl having a radial surface, cam surfaces indented in said circular surface on said operating lever at each of a plurality of detent positions, radial detent surfaces indented in said peripheral surface on said operated lever at each of a plurality of detent positions facing in the direction that said operated lever is biased, and means to bias said pawl to an engaged position to engage said cam and detent surfaces at one detent position, said pawl being operative in said engaged position to normally hold said operating and operated levers in said one relative position at one detent position and said pawl being operative in response to initial movement of said operating lever in said one direction from said one detent position during the lost motion movement of said operating lever from said one to another relative position without movement of said operated lever, and said initial movement of said operating lever moving the cam surface on said operating lever at said one detent position in engagement with said pawl to lift said pawl from said engaged position to a disengaged position out of engagement with the radial surface at said detent position on to the circular surface of said operating lever and then during continued movement of said levers in unison to permit movement of said operating and operated levers with said pawl riding on said circular surface of said operating lever to a second position where the cam surfaces permit movement of said pawl so that the radial surface on said pawl and another detent surface on said operated lever engage under the biasing force of said operated lever biasing means to locate said operated lever in a second position.

References Cited by the Examiner
UNITED STATES PATENTS

| | | |
|---|---|---|
| 815,578 | 3/1906 | Brown. |
| 2,473,845 | 6/1949 | Barsun _____ 74—540 |

References Cited by the Applicant
UNITED STATES PATENTS

| | | |
|---|---|---|
| 1,653,654 | 12/1927 | Myers. |
| 1,827,746 | 10/1931 | Hansen. |
| 2,534,566 | 12/1950 | Yapp. |
| 2,560,154 | 7/1951 | Brown. |
| 2,785,586 | 3/1957 | Schwerdhofer. |
| 2,983,160 | 5/1961 | Hause. |
| 3,001,618 | 9/1961 | McCordic et al. |
| 3,003,360 | 10/1961 | Fodrea. |
| 3,151,497 | 10/1961 | Winchell et al. |
| 3,177,737 | 4/1965 | Williams et al. |

FOREIGN PATENTS

| | | |
|---|---|---|
| 498,820 | 1/1939 | Great Britain. |
| 71,647 | 2/1947 | Norway. |

MILTON KAUFMAN, *Primary Examiner.*